Patented June 18, 1940

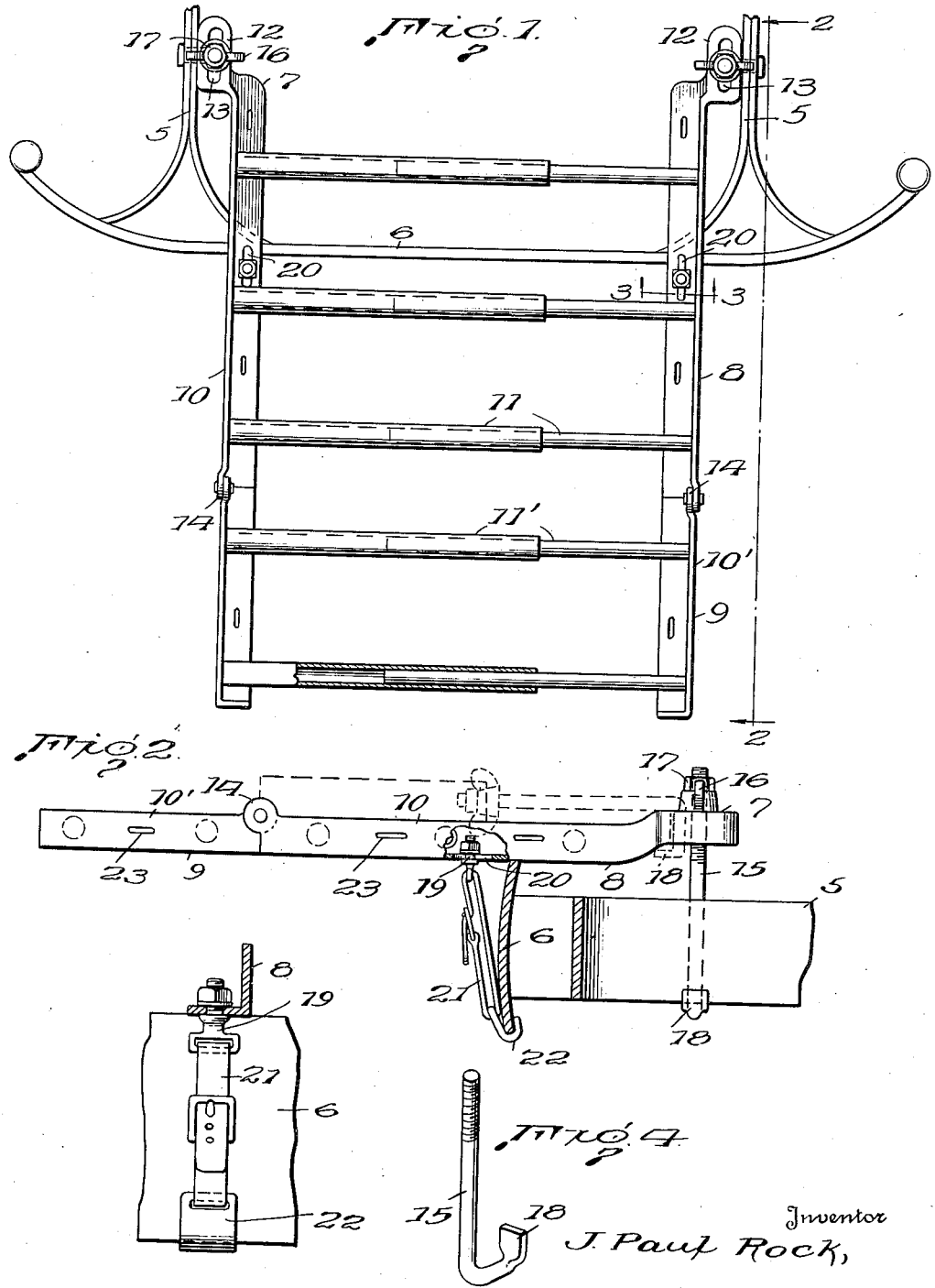

2,204,824

UNITED STATES PATENT OFFICE 2,204,824

COLLAPSIBLE LUGGAGE CARRIER

John Paul Rock, Duluth, Minn.

Application March 5, 1938, Serial No. 194,169

1 Claim. (Cl. 224—29)

The present invention consists of a collapsible luggage carrier for use on motor vehicles and although especially designed for attachment to the vehicle bumper, it is nevertheless equally applicable to a part of the vehicle per se.

After somewhat exhaustive experimentation with motor vehicle luggage carriers of various types, but especially those adapted for use on bumpers, I have found it essential to the proper functioning of carriers, and also to prevent breakage or distortion, that the attaching terminals of the carrier be of especial construction; with my carrier I have found from experiment that the latter will sustain a load of several hundred pounds without damage to the vehicle, bumper or carrier, ample flexibility and leverage being provided at all times with an absence of lost motion, by reason of a simple adjustable anchor for the carrier.

The carrier of my invention is constructed to permit facile and expeditious attachment to and removal from motor vehicles of standard construction, the carrier being foldable into a relatively flat position for convenience in storage.

Various other objects will manifest themselves from the following description of the present preferred form of the invention, taken in connection with the accompanying drawing, wherein:

Fig. 1 is a top plan view of a carrier constructed in accordance with the present invention illustrating its application to a motor vehicle bumper of standard construction, Fig. 2 is a sectional view taken on the line 2—2 of Fig. 1, looking in the direction of the arrows, the carrier being shown in side elevation, with a portion thereof broken away to disclose details, Fig. 3 is a horizontal sectional view taken on the line 3—3 of Fig. 1, looking in the direction of the arrows, illustrating to advantage the anchoring means between the carrier and the automobile bumper, and Fig. 4 is a perspective view of one of the carrier attaching hooks.

To illustrate the application of my invention, a portion of a motor vehicle bumper of conventional construction is shown, which includes arms 5 adapted for engagement with the vehicle, the arms being connected by a bumper bar 6.

The carrier of my invention, generally designated 7, consists of a supporting frame preferably composed of a body 8 and an auxiliary frame section 9, the latter being connected to the body in a manner more fully hereinafter set forth.

The body 8 of the frame consists of parallel angle members 10 which are connected together by telescoping bars 11, the inner end of each member issuing into a terminal lug 12, which, as shown to advantage in Figs. 1 and 2, is both laterally and vertically off set. Each of the lugs 12 is provided with an elongated recess 13 which is adapted for the reception of suitable means for attaching the lug to an arm 5 of the bumper or to a part of the motor vehicle.

The auxiliary frame section 9 includes angle side members 10' connected by telescoping bars 11', the members 10' being of similar construction to the members 10 and bars 11' to bars 11. The adjacent terminals of the bars 10 and 10' are provided with laterally off set ears 14, through each bar of which a pivot pin is engaged. In this way the section 9 is hingedly engaged to the body 8 and when not in use may be folded into superimposed relationship with the body, as illustrated by the dotted lines in Fig. 2.

The means employed in the present invention for connecting the lugs 12 to the arms 5 of the bumper or to the vehicle, consists of hooks 15, one of which is movably mounted in each of the slots 13, the terminal of the shank of each hook being screw threaded and adapted for the reception of a wing nut 16 and a locking nut 17. The free end of the bill of the hook is flattened and provides a substantially rectangular terminal 18, the latter being freely movable through either of the slots 18, in a manifest manner, when the bolt is to be engaged in the slot. After the bolt has been engaged, as shown in Figs. 1 and 2, casual displacement of the bill of the hook through the slot is reduced to a minimum, since it is necessary to bring the long axis of the flattened terminal 18 into register with the long axis of the slot. When the carrier is used, in the manner shown in Fig. 1 of the drawing, the hooks 15 lie within the lateral confines of the arms 5 and the bills of the hooks are turned outwardly for engagement with the bottom faces of said arms, as illustrated to advantage in Figs. 1 and 2. When the load to be supported by the carrier requires a broader supporting base, the side members 10 of the frame are moved laterally in opposite directions so that the lugs 12 will be in vertical planes outside of the arms 5. When the carrier is adjusted to this position, the hooks 15 pend outside of the lateral confines of the arms 5 and the bills of the hooks are turned inwardly and engaged with the bottom faces of the arms 5. It is, of course, understood that after the bills of the hooks have been engaged with the arms, the butterfly nuts 16 are tightened and, if desired, the locking nuts 17 may be employed. It is preferred to use the locking nuts when the carrier is to be left attached to the vehicle over an extended period of time.

It is, of course, to be understood that when the carrier is in use, the lugs 12 lie in close proximity to the back of the motor vehicle so that an appreciable amount of the load on the carrier will be sustained by the vehicle or the bumper within the confines of the latter. It is obvious that where the bills of the hooks 15 are to be engaged to a part of the vehicle, such for instance as the rear of the vehicle chassis, said bills are turned in the direction of the vehicle and engaged with the latter in an apparent manner.

When the carrier is mounted on the bumper and engaged with the latter in the manner above described, the side members 10 of the bumper frame lie on top of the bumper bar 6. In order to hold these side members in snug engagement with the bumper bar, I prefer to employ anchoring means. One form of anchoring means which may be used, as shown in Figs. 2 and 3, consists of eye bolts 19, each of which is detachably and slidably mounted in a slot 20, the slot being formed in the horizontal angle of the side member 10. The eye of said bolt has a strap 21 trained therethrough, said strap being also trained through an opening formed adjacent one end of a saddle plate 22. The saddle plate is, as shown in Figs. 2 and 3, hooked over the bottom of the bumper bar 6. Of course, as is understood, the straps 21 may be adjusted from time to time to take up any wear and furthermore the eye bolts 19 are longitudinally adjustable in the members 10 to conform to different types of bumpers. In this way stress on the straps will be on a line parallel to the bumper.

If desired, the side members 10 and 10' may be provided with openings 23 through which straps or other attaching means may be engaged for securing the load on the carrier.

By vertically offsetting the lugs 12, the carrier is permitted to slide with facility into place on any bumper assembly of conventional design. By laterally offsetting the lugs 12, a variance in the range of width of the carrier of approximately 4" is available which, of course, may be increased or diminished at the option of the manufacturer.

When the carrier is not in use, it may be folded into a minimum amount of space for storage, under a seat of the automobile or like place. Not only is the auxiliary section 10' of the carrier foldable into the dotted line position, shown in Fig. 2, as already explained, but in addition the side members may be brought into relatively close proximity and the bolts 15 may be moved into a position parallel with the side members, as shown by the dotted lines in Fig. 2.

I, of course, understand that various changes may be made within the scope of the claim hereto appended.

What is claimed is:

A luggage carrier for attachment to the bumper bar and bumper arms of a motor vehicle, including a carrier frame, the sides of which are extended at one end, said frame adapted to rest on top of the bumper bar and to be anchored to the latter, a hook for, and slidably engageable with either side of each bumper arm, the shank of the hook extending through and rotatably mounted in one of the extended ends of the frame, the frame consisting of laterally movable sections to permit engagement of the hooks with the bumper arms from different sides of the latter.

JOHN PAUL ROCK.